United States Patent
Ellis et al.

(10) Patent No.: US 11,432,102 B2
(45) Date of Patent: *Aug. 30, 2022

(54) MOBILE PROXIMITY BASED MESSAGES

(71) Applicant: Groupon, Inc., Chicago, IL (US)

(72) Inventors: Scott Ellis, Palo Alto, CA (US); Devdatta Gangal, Mountain View, CA (US); Jayesh Joy, Sunnyvale, CA (US); Hamish Barney, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,042

(22) Filed: Jun. 27, 2019

(65) Prior Publication Data

US 2020/0100052 A1 Mar. 26, 2020

Related U.S. Application Data

(63) Continuation of application No. 15/859,871, filed on Jan. 2, 2018, now Pat. No. 10,382,888, and a
(Continued)

(51) Int. Cl.
*H04W 4/021* (2018.01)
*H04W 4/02* (2018.01)
(Continued)

(52) U.S. Cl.
CPC .......... *H04W 4/021* (2013.01); *H04L 51/20* (2013.01); *H04L 67/26* (2013.01); *H04W 4/023* (2013.01); *G06Q 30/0261* (2013.01)

(58) Field of Classification Search
CPC ...... H04W 4/021; H04W 4/023; H04L 67/26; H04L 51/20; G06Q 30/0261
See application file for complete search history.

(56) References Cited

U.S. PATENT DOCUMENTS 9,769,604 B2 * 9/2017 Lyman ................. H04W 4/021
2012/0221706 A1 * 8/2012 Westberg ............. H04L 47/801
709/223

(Continued)

OTHER PUBLICATIONS

Dan Moren, "Get to Know iOS 7: Multitasking", Sep. 18, 2013, www.macworld.com, pp. 1-3.*
(Continued)

*Primary Examiner* — Brandon J Miller
(74) *Attorney, Agent, or Firm* — Alston & Bird LLP

(57) ABSTRACT

Techniques for providing proximity based messages are discussed herein. Some embodiments may include one or more servers configured to receive proximity message requests from a consumer device. The requests may include consumer device locations, which may be used by the one or more servers to generate a geofence set. Furthermore, the consumer device location may be used as a basis for selecting notification data relevant to the location. Both the geofence set and the notification data may be sent to the consumer device in a single proximity message response for local notification creation if the notification data can be collected within a maximum response time. The notification data may be provided via a push notification server asynchronously if the notification data cannot be collected within the maximum response time.

21 Claims, 8 Drawing Sheets

Related U.S. Application Data continuation of application No. 15/191,344, filed on Jun. 23, 2016, now Pat. No. 10,034,129.

(60) Provisional application No. 62/184,120, filed on Jun. 24, 2015.

(51) Int. Cl.
    *H04L 51/222*     (2022.01)
    *H04L 67/55*     (2022.01)
    *G06Q 30/02*     (2012.01)

(56) References Cited

U.S. PATENT DOCUMENTS

| | | | |
|---|---|---|---|
| 2012/0293465 A1* | 11/2012 | Nandu | H04W 4/029 345/204 |
| 2013/0045760 A1* | 2/2013 | Obermeyer | G08B 21/0277 455/456.6 |
| 2013/0218455 A1 | 8/2013 | Clark | |
| 2014/0156801 A1* | 6/2014 | Fernandes | H04L 67/26 709/219 |
| 2015/0120453 A1 | 4/2015 | Lee et al. | |
| 2015/0189615 A1 | 7/2015 | Rembarz et al. | |
| 2015/0235332 A1* | 8/2015 | Styve | G06Q 10/06311 705/7.13 |
| 2015/0269624 A1 | 9/2015 | Cheng et al. | |
| 2016/0202069 A1* | 7/2016 | Wippler, III | G01C 21/26 701/400 |

OTHER PUBLICATIONS

Ben Patterso, "iPhone Alerts, Badges, and Banners—What's the Difference?", Jan. 22, 2014, www.hersthethingblog.com, p. 6.*
U.S. Appl. No. 14/824,912, filed Aug. 12, 2015, first named inventor Steve Casey, 59 pages.
U.S. Appl. No. 14/824,922, filed Aug. 12, 2015, first named inventor Abhaya Parthy, 50 pages.
U.S. Appl. No. 14/824,929, filed Aug. 12, 2015, first named inventor Greyson E. Gregory, 53 pages.
U.S. Appl. No. 14/824,934, filed Aug. 12, 2015, first named inventor Shu Cai, 51 pages.
U.S. Appl. No. 62/140,957, filed Mar. 31, 2015, first named inventor Steven Casey, 49 pages.

* cited by examiner

MOBILE PROXIMITY BASED MESSAGES

CROSS REFERENCE TO RELATED APPLICATIONS

This application is a continuation of U.S. patent application Ser. No. 15/191,344, titled "Mobile Proximity Based Messages," filed Jun. 23, 2016, which claims the benefit of U.S. Provisional Patent Application No. 62/184,120, titled "Mobile Proximity Based Messages," filed Jun. 24, 2015, the contents of which are hereby incorporated by reference herein in their entirety.

FIELD

Embodiments of the invention relate, generally, to techniques for providing notifications to mobile consumer devices based on consumer device location.

BACKGROUND

Promotional systems provide promotions associated with merchants to consumer devices through various electronic communication channels such as email, application alert, webpage, text message, among other things. The effectiveness of promotional offers can depend on factors such as the relevance of the offers to the locations of the consumer, or the redemption locations of the promotional offers. In this regard and others as discussed herein, areas for improving current techniques have been identified.

BRIEF SUMMARY

Through applied effort, ingenuity, and innovation, solutions to improve such systems have been realized and are described herein. Various embodiments of the present invention are directed to improved apparatuses, methods, and computer readable media for providing proximity based messages via a network.

Some embodiments may include a system for providing proximity based messages via a network, comprising: one or more servers configured to: establish a wireless connection with a consumer device via the network; receive a proximity message request from the consumer device, wherein the proximity message request includes location data defining a consumer device location of the consumer device; and in response to receiving the proximity message request: determine proximate locations to the consumer device location based on the location data; determine a geofence set including a geofence associated with each of the proximate locations; determine a first geofence where the consumer device is located based on the proximity message request; determine a maximum response time defining a maximum time in which the one or more servers are allowed to attempt to collect notification data associated with the first geofence from one or more database on behalf of the consumer device, wherein the notification data is stored in the one or more databases; determine whether the notification data defining a notification associated with the first geofence can be collected within the maximum response time by querying the one or more databases; and in response to determining that the notification data can be collected within the maximum response time: generate a proximity message response including the geofence set and the notification data associated with the first geofence; and provide the proximity message response to the consumer device via the network; and in response to determining that the notification data cannot be collected within the maximum response time, provide the notification data associated with the first geofence to a push notification server configured to generate the notification based on the notification data and asynchronously push the notification to the consumer device.

In some embodiments, the one or more servers may be further configured to, subsequent to providing the proximity message response to the consumer device: receive a second proximity message request from the consumer device, wherein the second proximity message request includes second location data defining a second consumer device location, and wherein the second location data indicates that the consumer device has reached a second geofence of the geofence set; in response to receiving the second message notification request: determine second proximate locations to the second consumer device location based on the second location data; determine a second geofence set including a geofence associated with each of the second proximate locations; generate a second proximity message response including the second geofence set and second notification data associated with the second geofence; and provide the second proximity message response to the consumer device via the network.

In some embodiments, the one or more servers may be further configured to: determine whether the consumer device location is within a second geofence based on the location data; and in response to determining that the consumer device location fails to be within the second geofence: generate a second proximity message response including the geofence set independent of the notification data; and provide the second proximity message response to the consumer device via the network.

In some embodiments, the one or more servers may be further configured to, in response to determining that the notification data cannot be collected within the maximum response time: generate a second proximity message response including the geofence set and independent of the notification; and provide the second proximity message response to the consumer device via the network.

In some embodiments, the one or more servers configured to determine the maximum response time may include the one or more servers being configured to receive the maximum response time from the consumer device with the proximity message request.

In some embodiments, the one or more servers may be further configured to: receive an access indication from the consumer device indicating an interaction with the notification via consumer device input; and in response to receiving a second proximity message request, determine second notification data based at least in part on the access indication.

In some embodiments, the one or more servers may be further configured to: receive a presentation indication from the consumer device indicating a display of the notification on the consumer device; and in response to receiving a second proximity message request, determine second notification data based at least in part on the presentation indication.

In some embodiments, the one or more servers may be further configured to: track a proximity message response count; determine a proximity message response threshold; and in response to determining that the proximity message response count fails to exceed the proximity message response threshold: provide the proximity message response to the consumer device via the network; and increment the proximity message response count.

In some embodiments, the proximity message response may further include a badge number of a consumer application icon of the consumer device when the application is executing in the background of an operating system of the consumer device.

In some embodiments, the system may further include the consumer device, configured to: determine the location data; determine whether the consumer device is located within the first geofence; and in response to determining that the consumer device is located within the first geofence, send the proximity message request to the consumer device.

In some embodiments, the consumer device may be further configured to generate a local notification based on the notification data.

In some embodiments, the consumer device may be further configured to send a presentation indicator to the one or more servers subsequent to generating the local notification.

In some embodiments, the consumer device may be further configured to send an access indicator to the one or more servers subsequent to receiving a consumer device input indicating a consumer interaction with the local notification.

In some embodiments, the consumer device may be further configured to: determine whether a consumer application is executing in a background or a foreground of a mobile operating system of the consumer device; and in response to determining that the consumer application is executing the foreground, generate a local notification including an alert view based on the notification data.

In some embodiments, the consumer device may be further configured to: determine whether a consumer application is executing in a background or a foreground of a mobile operating system of the consumer device; and in response to determining that the consumer application is executing the background, generate a local notification including one of a banner view or an alert view based on the notification data.

In some embodiments, the consumer device may be configured to select one of the banner view or the alert view based on at least one of a consumer device input or a predefined value.

Some embodiments may include a method for providing proximity based messages via a network, comprising: establishing, by one or more servers, a wireless connection with a consumer device via the network; receiving, by the one or more servers, a proximity message request from the consumer device, wherein the proximity message request includes location data defining a consumer device location of the consumer device; and in response to receiving the proximity message request, and by the one or more servers: determining proximate locations to the consumer device location based on the location data; determining a geofence set including a geofence associated with each of the proximate locations; determining a first geofence where the consumer device is located based on the proximity message request; determining a maximum response time; determining whether notification data defining a notification associated with the first geofence can be collected within the maximum response time; in response to determining that the notification data can be collected within the maximum response time: generating a proximity message response including the geofence set and the notification data associated with the first geofence; and providing the proximity message response to the consumer device via the network; and in response to determining that the notification data cannot be collected within the maximum response time, provide the notification data associated with the first geofence to a push notification server configured to generate the notification based on the notification data and asynchronously push the notification to the consumer device.

In some embodiments, the method may further include, by the one or more servers and subsequent to providing the proximity message response to the consumer device: receiving a second proximity message request from the consumer device, wherein the second proximity message request includes second location data defining a second consumer device location, and wherein the second location data indicates that the consumer device has reached a second geofence of the geofence set; in response to receiving the second message notification request: determining second proximate locations to the second consumer device location based on the second location data; determining a second geofence set including a geofence associated with each of the second proximate locations; generating a second proximity message response including the second geofence set and second notification data associated with the second geofence;

and providing the second proximity message response to the consumer device via the network.

In some embodiments, the method may further include, by the one or more servers: determing whether the consumer device location is within a second geofence of the geofence set based on second location data; and in response to determining that the consumer device location fails to be within the second geofence: generating a second proximity message response including a geofence set based on the second location, wherein the second proximity message response is independent of notification data; and providing the second proximity message response to the consumer device via the network.

In some embodiments, the method may further include, by the one or more servers and in response to determining that the notification data cannot be collected within the maximum response time: generating a second proximity message response including the geofence set and independent of the notification; and providing the second proximity message response to the consumer device via the network.

In some embodiments, determining the maximum response time may include receiving the maximum response time from the consumer device with the proximity message request.

In some embodiments, the method may further include, by the one or more servers: receiving an access indication from the consumer device indicating an interaction with the notification via consumer device input; and in response to receiving a second proximity message request, determining second notification data based at least in part on the access indication.

In some embodiments, the method may further include, by the one or more servers: receiving a presentation indication from the consumer device indicating a display of the notification on the consumer device; and in response to receiving a second proximity message request, determining second notification data based at least in part on the presentation indication.

In some embodiments, the method may further include, by the one or more servers: tracking a proximity message response count; determining a proximity message response threshold; and in response to determining that the proximity message response count fails to exceed the proximity message response threshold: providing the proximity message response to the consumer device via the network; and incrementing the proximity message response count.

In some embodiments, the proximity message response further includes a badge number of a consumer application icon of the consumer device when the application is executing in the background of an operating system of the consumer device.

In some embodiments, the method may further include, by the consumer device: determining the location data; determining whether the consumer device is located within the first geofence; and in response to determining that the consumer device is located within the first geofence, sending the proximity message request to the consumer device.

In some embodiments, the method may further include, by the consumer device, generating a local notification based on the notification data.

In some embodiments, the method may further include, by the consumer device, sending a presentation indicator to the one or more servers subsequent to generating the local notification.

In some embodiments, the method may further include, by the consumer device, sending an access indicator to the one or more servers subsequent to receiving a consumer device input indicating a consumer interaction with the local notification.

In some embodiments, the method may further include, by the consumer device: determining whether a consumer application is executing in a background or a foreground of a mobile operating system of the consumer device; and in response to determining that the consumer application is executing the foreground, generating a local notification including an alert view based on the notification data.

In some embodiments, the method may further include, by the consumer device: determining whether a consumer application is executing in a background or a foreground of a mobile operating system of the consumer device; and in response to determining that the consumer application is executing the background, generating a local notification including one of a banner view or an alert view based on the notification data.

In some embodiments, the method may further include, by the consumer device, selecting one of the banner view or the alert view based on at least one of a consumer device input or a predefined value.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
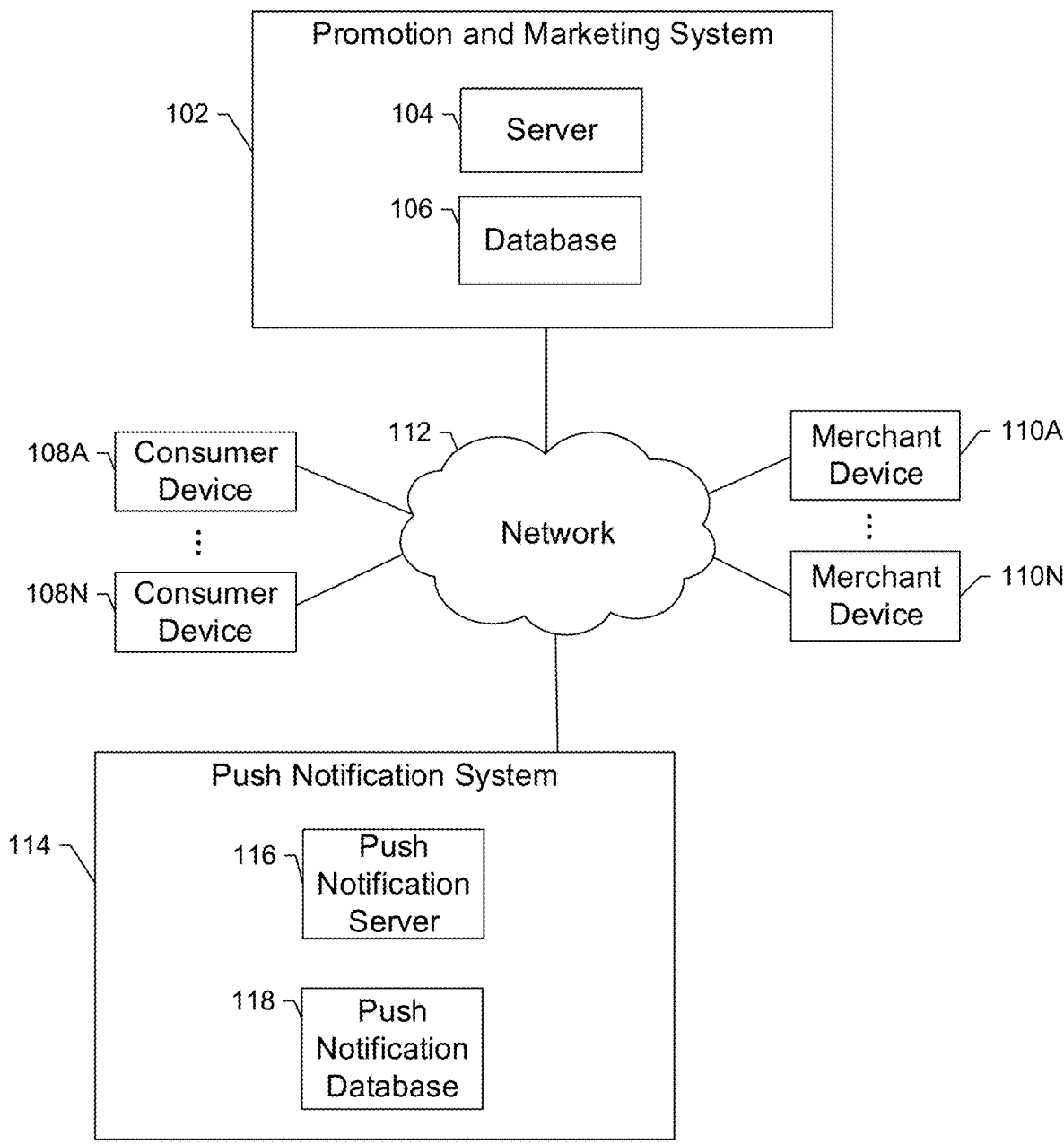
Figure 2:
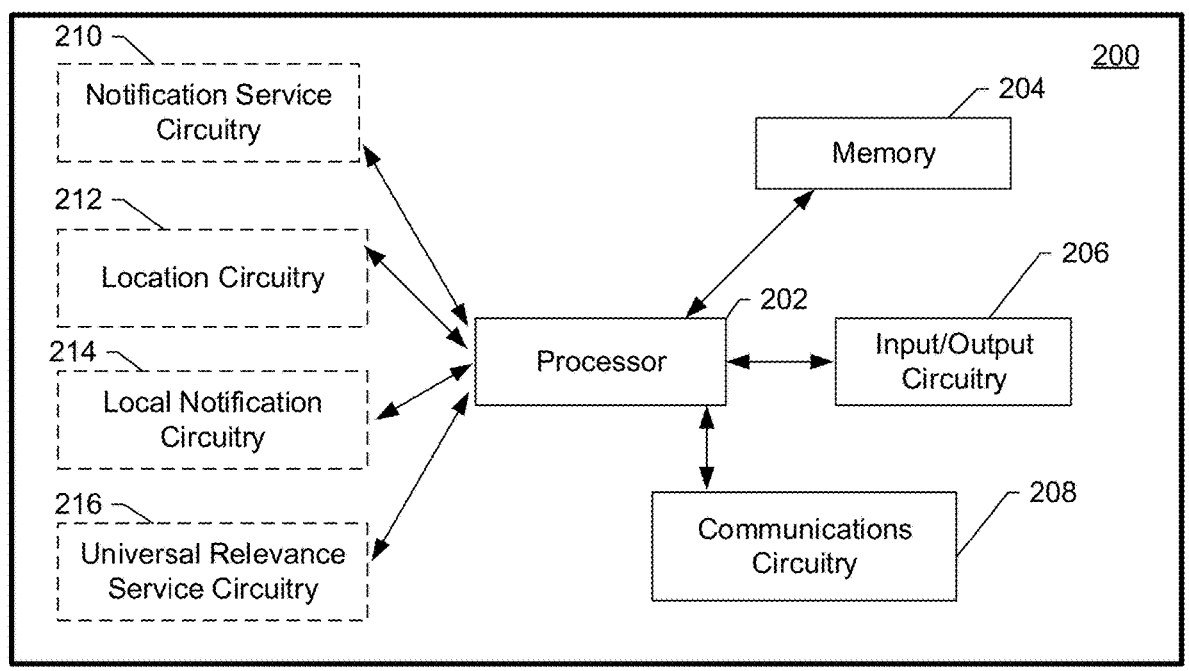
Figure 3:
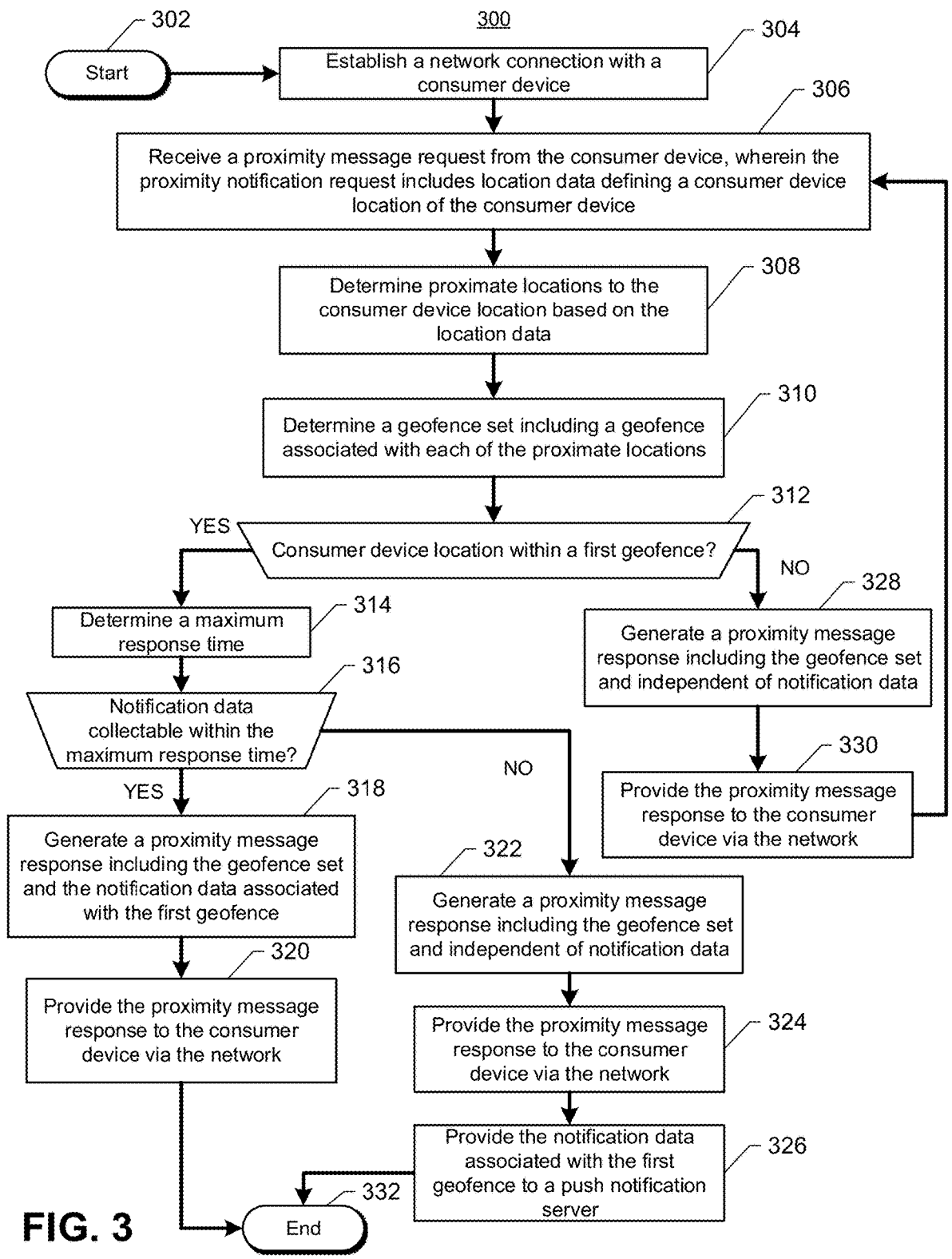
Figure 4:
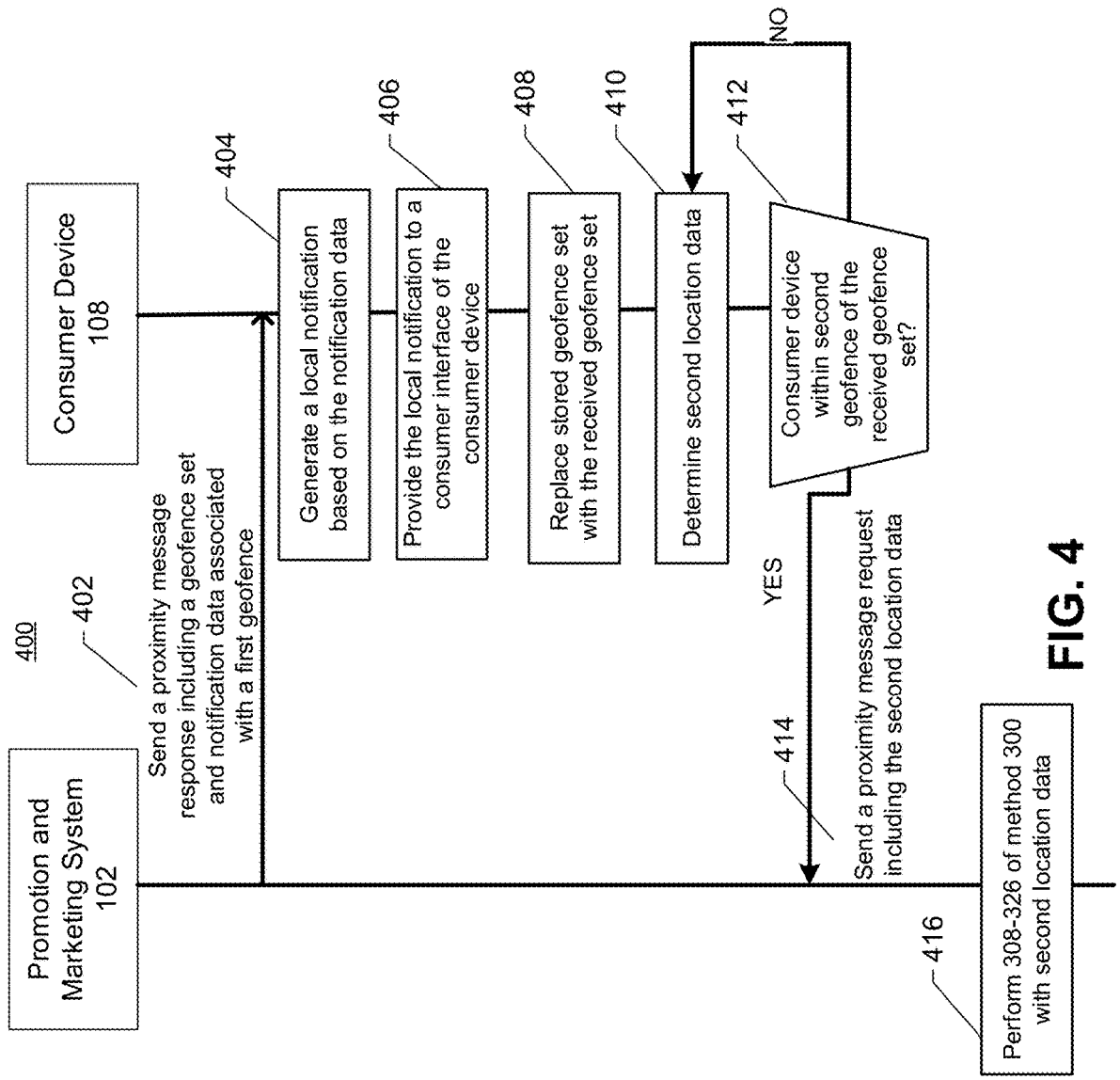
Figure 5:
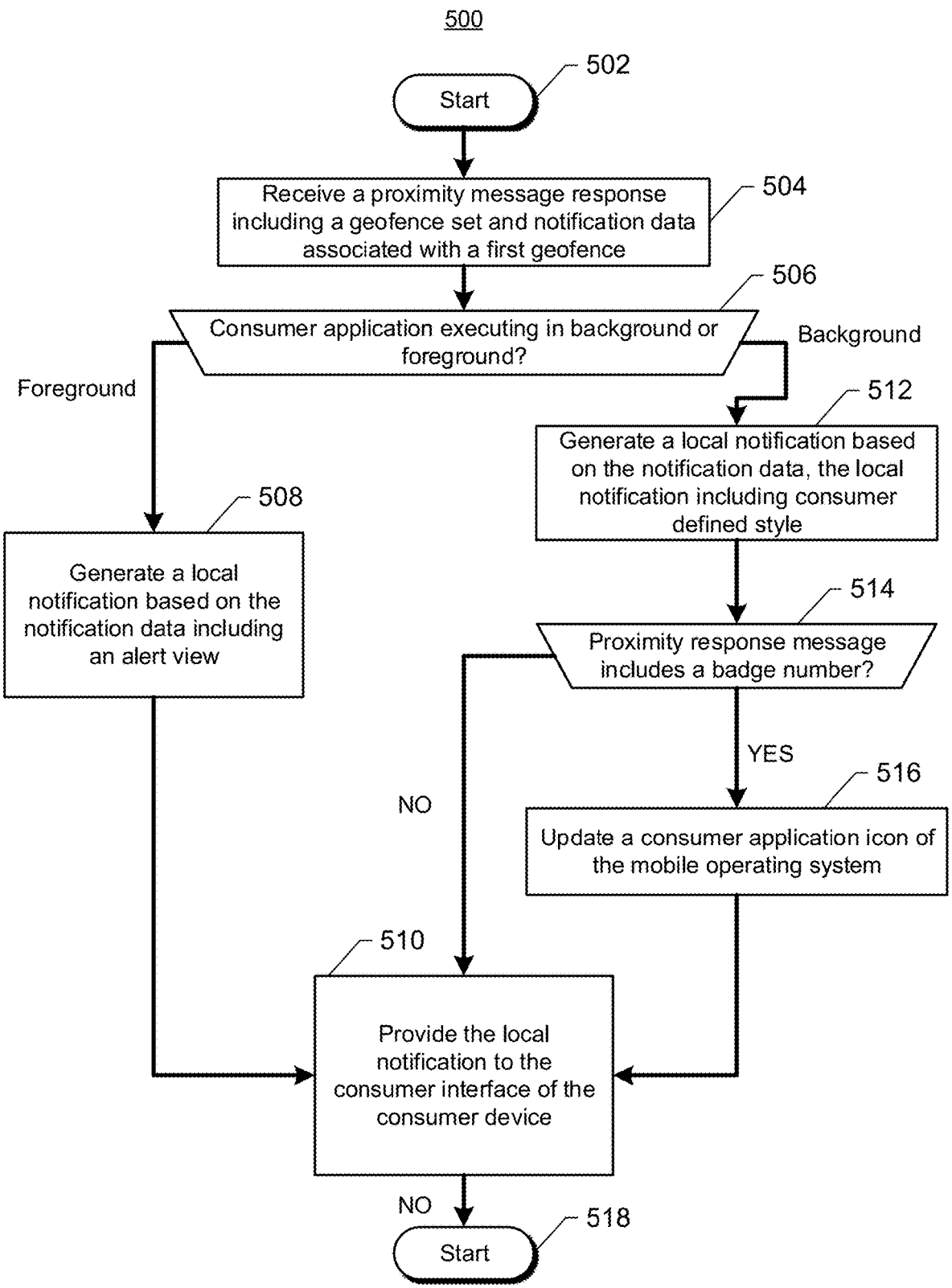
Figure 6:
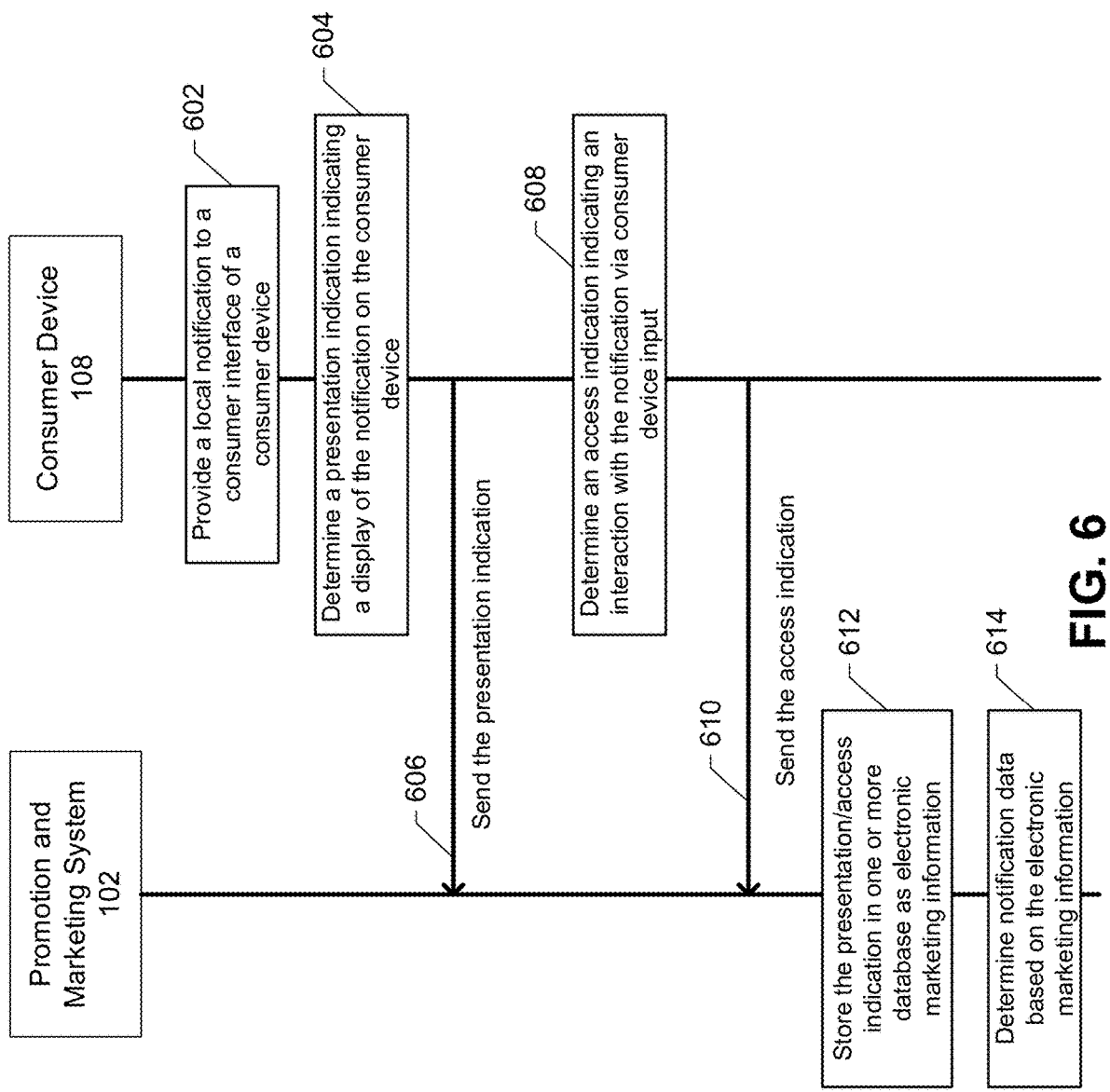
Figure 7:
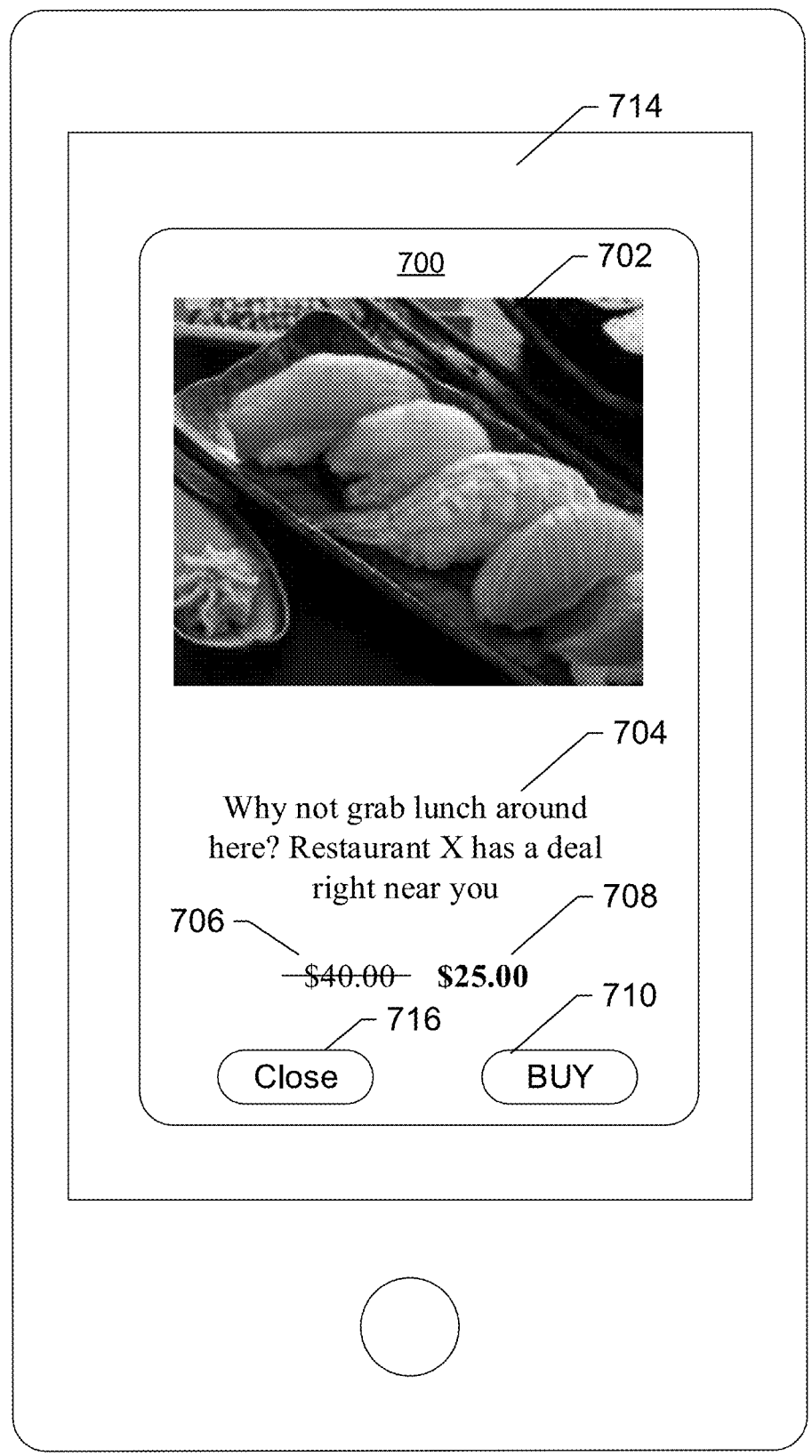
Figure 8:
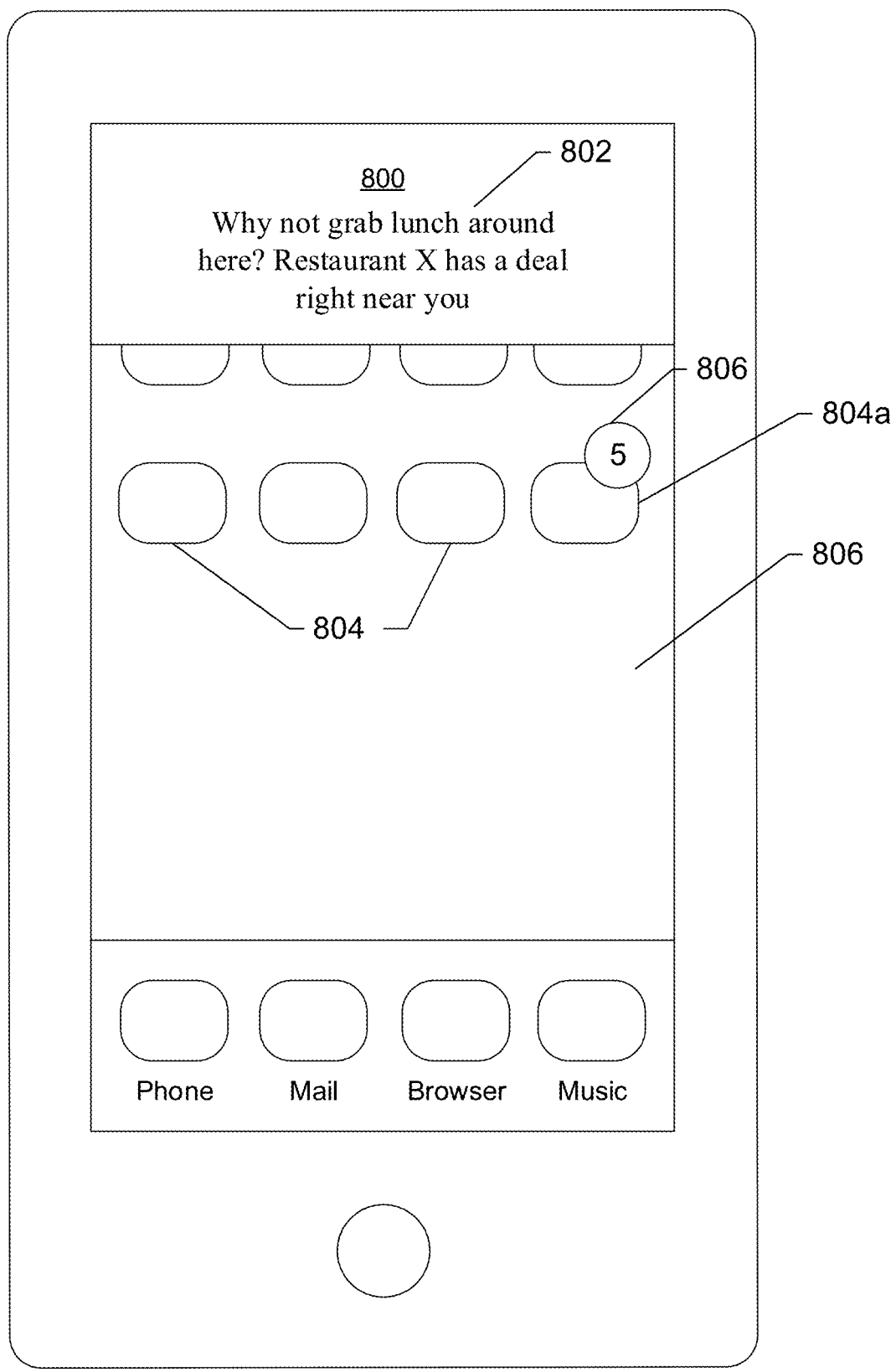

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of example circuitry in accordance with some embodiments;

FIG. 3 shows a flow chart of an example of a method of providing a proximity based message in accordance with some embodiments;

FIG. 4 shows a flowchart of an example of a method of processing a received proximity based message in accordance with some embodiments;

FIG. 5 shows a flowchart of an example of a method of generating a local notification in accordance with some embodiments;

FIG. 6 shows a flow chart of an example of a method of tracking notifications in accordance with some embodiments; and FIGS. 7 and 8 show examples of local notifications in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" or "notification service" may include a service that is accessible via one or more computing devices and that is operable to provide promotion and/or marketing services on behalf of one or more providers that are offering one or more instruments that are redeemable for goods, services, experiences and/or the like. The promotion and marketing service may be provided by a promotion and marketing system. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. The parameters of a promotion may be defined by promotion data. In some embodiments, the promotion data may define one or more redemption locations for a promotion, such as a merchant shop, restaurant, retail shop, etc.

Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to (e.g., local or push) mobile notifications, communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), (e.g., consumer device) location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, and/or presence-based wireless detection (e.g., where the consumer device is detected upon entering a communicable range of a detecting device, such as a beacon or merchant device located at a merchant shop/redemption location) such as personal area networks (PAN) (e.g., using WiFi, Bluetooth, etc.), infrared or other visual sensors, and/or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "electronic marketing communication" refers to any electronically generated information content provided by the promotion and marketing service to a consumer for the purpose of marketing a promotion, good, or service to the consumer. Electronic marketing communications may include any local notification, push notification, email, short message service (SMS) text message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 shows an example computing system within which embodiments of the present invention may operate. Consumers and merchants may access a promotion and marketing service from a promotion and marketing system 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing system 102 may comprise a server 104 and a database 106.

The server 104 may be embodied as a single computer or multiple computers. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic marketing communications, including local and/or push notifications, based on the received electronic data (e.g., historical promotion data, electronic marketing data, etc.). The server 104 may be further configured to facilitate tracking of consumer interactions with the electronic marketing communications, which may be used to build consumer profiles for subsequent targeted offers or notifications. Although a single server 104 is shown, system 102 may include one or more servers 104. In some embodiments, the one or more servers 104 may include notification service circuitry 210, as shown in FIG. 2, configured to perform the techniques discussed herein with respect to providing proximity based notifications to consumer devices 108.

Returning to FIG. 1, database 106 may be embodied as a data storage device such as a Network Attached Storage (NAS) device or devices, or as a separate database server or servers. The database 106 includes information accessed and stored by the server 104 to facilitate the operations of the promotion and marketing system 102. For example, the database 106 may include, without limitation, goefence data defining geofences, merchant data, promotion/item data, notification data defining notification content, user account credentials for system administrators, merchants, and consumers, promotion data indicating the products and promotions offered by the promotion and marketing service, clickstream data, analytic results, reports, financial data, and/or the like. In some embodiments, the various types of data may be organized across separate physical databases represented by a plurality of databases 106 of the system 102.

The consumer devices 108A-108N may be any computing device as known in the art and operated by a consumer. Electronic data received by the server 104 from the consumer devices 108A-108N may be provided in various forms and via various methods. The consumer devices 108A-108N may include mobile devices, such as laptop computers, smartphones, netbooks, tablet computers, wearable devices (e.g., electronic watches, wrist bands, glasses, etc.), and the like. Such mobile devices may be carried by a user while a wireless network connection is established with the one or more servers 104 via network 112. In some embodiments, the consumer devices 108A-108N may include wired or stationary devices such as desktop computers or workstations. Such stationary devices may be used, for example, to interact with the promotion and marketing service. For example, notifications may be provided to a stationary consumer device based on location data tracked from a different mobile consumer device.

In embodiments where a consumer device 108 is a mobile device, such as a smart phone or tablet, the consumer device 108 may execute an "app" or "consumer application" to interact with the promotion and marketing system 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing system 102 may leverage the application framework offered by the mobile operating system to allow consumers to designate which information is provided to the app and which may then be provided to the promotion and marketing system 102. In some embodiments, consumers may "opt in" to provide particular data to the promotion and marketing system 102 in exchange for a benefit, such as improved relevancy of marketing communications offered to the user. In some embodiments, the consumer may be provided with privacy information and other terms and conditions related to the information provided to the promotion and marketing system 102 during installation or use of the app. Once the consumer provides access to a particular feature of the mobile device, information derived from that feature may be provided to the promotion and marketing system 102 to improve the quality of the consumer's interactions with the promotion and marketing service.

For example, the consumer may indicate that they wish to provide location information to the app from location services circuitry included in their mobile device. Providing this information to the promotion and marketing system 102 may enable the promotion and marketing system 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing system 102. For example, the consumer may decide at a later point to disable the ability of the app to access the location services circuitry, thus limiting the access of the consumer's location information to the promotion and marketing system 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing system 102 via a web browser. As yet another example, the consumer device 108 may include various hardware or firmware designed to interface with the promotion and marketing system 102 (e.g., where the consumer device 108 is a purpose-built device offered for the primary purpose of communicating with the promotion and marketing system 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing system 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing system 102 to enable the promotion and marketing system 102 to generate promotions or other marketing information to be provided to consumers.

In some embodiments, system 100 may further include push notification system 114. The push notification system 114 may include a push notification server 116 and a push notification database 118. The push notification system 114 may be connected with the promotion and marketing system 102 and the consumer devices 108 (an in some embodiments, merchant device 110) via the network 112. The push notification system may be configured to receive notification data from the system 102, which may be stored in the push notification database 118 and used to queue push notification tasks. The push notification system 114 may generate a push notification based on the notification data, and provide the push notification to the consumer device 108. In contrast, the system 102 may be alternatively or additionally configured to provide local notifications directly to the consumer device 108, as discussed in further detail herein.

Example Apparatus[es] for Implementing Various Embodiments

The server 104, database 106, server 116, database 118, consumer device 108 or merchant device 110 may be embodied by one or more computing systems or devices, such as apparatus 200 shown in FIG. 2. As illustrated in FIG. 2, the apparatus 200 may include a processor 202, a memory 204, an input/output circuitry 206, communications circuitry 208, a notification service circuitry 210, and location circuitry 212, local notification circuitry 214, and universal relevance circuitry 216. The apparatus 300 may be configured to execute the operations described herein. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

When circuitry 200 is located in a server 104, circuitry 200 may further include notification service circuitry 210 and/or universal relevance circuitry 216. The notification service circuitry 210 may include hardware configured to generate notifications. For example, notification service circuitry 210 may receive proximity message requests from consumer devices 108, and may send proximity message responses that include proximate geofences and notification data. In some embodiments, the notification service circuitry 210 may be configured to provide the functionality discussed herein with respect to tracking consumer device interactions with notifications for subsequent message customization and targeting. Universal relevance service circuitry may be configured to perform promotion and/or item scoring and/or ranking that is targeted to individual consumers based on electronic marketing information. Additional details regarding the universal relevance service, applicable in some embodiments, are discussed in U.S. Provisional Patent Application No. 62/140,957, titled "Universal Relevance Service Framework," filed Mar. 31, 2015, which is incorporated by reference herein in its entirety.

When circuitry 200 is located in a consumer device 108, circuitry 200 may further include location circuitry 210 and/or local notification circuitry 214, configured to perform the consumer device functionality discussed herein with respect to proximity based messages. The location circuitry 210 may be configured to determine location data indicating consumer device location. The local notification circuitry 214 may be configured to generate local notifications based on notification data received from system 102. In some embodiments, local notification circuitry 214 may be further configured to generate proximity message requests, manage consumer location tracking with respect to geofences, among other things.

Circuitries 210-216 may utilize processing circuitry, such as the processor 202, to perform these actions. However, it should also be appreciated that, in some embodiments, one or more of circuitries 210-216 may include a separate processor, specially configured field programmable gate array (FPGA), or application specific interface circuit (ASIC). Circuitry 210-216 may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium

Proximity Based Messages

FIG. 3 shows a flow chart of an example of a method 300 of providing a proximity based message in accordance with some embodiments. Method 300 is discussed herein as being performed by system 100, and in particular one or more servers 104 in connection with consumer device 108 and/or push notification system 114. For example, method 300 may be performed to provide a proximity message response to the consumer device based on consumer device location a mobile consumer device (e.g., a mobile phone, wearable device, tablet, navigation device, integrated device within a vehicle, etc.). In some embodiments, other suitably configured apparatuses, devices, and/or servers may also be used to perform method 300 (as well as the other methods discussed herein). For example, the consumer device 108 may be configured to perform some or all of the functionality discussed herein with respect to the one or more servers 104, such as in a standalone or fat client implementation.

Method 300 may begin at 302 and proceed to 304, where the one or more servers 104 (e.g., including notification service circuitry 210) may be configured to establish a network connection with a consumer device 108. For example, the network connection may be established via network 112. In some embodiments, the network connection may be initiated based on consumer device access to a consumer application for providing a consumer interface installed and/or otherwise executing on the consumer device. In another example, the consumer device may access a webpage configured to provide the consumer application/interface, such as by entering a uniform resource locator (URL) within a web browser. The connection between the consumer device 108 and the one or more servers 104 may include a wireless connection such that the consumer device may maintain network connectivity while traveling to different locations.

The consumer application may be installed on and/or otherwise executed by the processing circuitry of the consumer, such as on a mobile device operating system as discussed above. The consumer application may execute on the foreground of the operating system, or alternatively, may execute in the background. As discussed in greater detail below, the one or more servers 104 may provide notification data to the consumer device upon the satisfaction of various criteria. Depending on whether the consumer application is executing on the background or the foreground, the notification data may be presented on the consumer device in various formats.

At 306, the one or more servers 104 may be configured to receive a proximity message request from the consumer device, wherein the proximity notification request includes location data defining a consumer device location of the consumer device. The consumer device 108 may be configured to generate and send the proximity notification request to the one or more servers 104. The proximity notification request may be sent, for example, in response to the consumer device inputs (e.g., from a touchscreen and/or other user input device of the consumer device 108) activating the consumer application and/or otherwise configuring the consumer device to begin interacting with the system 102 and/or notification service. In some embodiments, even when in the consumer application is executing in the background of a mobile operating system, the consumer device may programmatically interact with the one or more servers 104 as discussed in further detail below, such as by generating proximity message requests to the one or more servers 104 based on the consumer device location.

In another example, the consumer device may be configured to generate and send the proximity message request based on the consumer device 108 having reached or otherwise being located within a geofence. A geofence, as used herein, refers to a predefined geographical area. The consumer device 108 may be configured to store a geofence set of proximate locations of interest. A geofence set, as used herein, refers to a collection of one or more geofences. The consumer device 108 may then monitor its own location with reference to the geofence set and generate and send the proximity message request when a geofence is reached while the consumer device 108 is traveling with the consumer.

The proximity message request may include location data defining the consumer device location may be determined using various suitable techniques, such as global positioning system (GPS), wireless-assisted GPS, indoor navigation systems, cellular tower triangulation techniques, video surveillance systems, presence-based wireless detectors, personal area networks (PAN) such as Bluetooth or WiFi, infrared or other visual sensors, RFID location systems, etc. In some embodiments, the consumer device 108 may include GPS receivers configured to communicate with (e.g., three or more) orbiting satellites to determine the location data based on trilateration. In some embodiments, the consumer device 108 may not include a GPS receiver and may instead transmit signals received from satellites to a GPS server configured to perform location data determination (e.g., based on trilateration). In another example, the consumer device 108 may be configured to determine the location data based on cell tower triangulation of signal strength levels. In some embodiments, the location data may take the form of latitude and longitude values.

At 308, the one or more server 104 may be configured to determine proximate locations to the consumer device 108 based on the location data. A "proximate location," as used herein, refers to a location of interest that is within a predefined distance of the consumer device location. For example, the predefined distance may be 1 mile, 2 miles, 10 miles, etc. In another example, the predefined distance may be set by the consumer device via the consumer interface. In some embodiments, the predefined distance may be programmatically determined by the one or more servers 104. For example, the predefined distance may be set based on a determined travel speed, which may be determined based on tracking consumer device locations over time. Here, a faster travel speed may be associated with a larger predefined distance because the further distances are more likely to be accessible to the consumer (e.g., traveling by car instead of by foot).

As discussed above, the proximate locations may include various locations of interests. In some embodiments, the one or more servers 104 may be configured to determine the proximate locations from a pool of "candidate locations." The candidate locations may include merchant shop locations including restaurants, retail shops, etc. The candidate locations may be stored in a merchant/location database (e.g., one or more databases 106 of the system 102). Each candidate location may be defined based on latitude and a longitude values. Each location may further be associated with other data relevant to the location. A merchant shop location, for example, may be associated with a merchant name, a geofence radius (e.g., or other geofence size definition), various other geofence-related data and/or metadata as discussed in greater detail below, available promotions, items offered, notification data (e.g., defining an advertising or other message of the merchant), etc.

In some embodiments, the merchant shop locations may each be associated with one or more merchant devices 110 located at each respective merchant shop location. The one or more servers 104 may be configured to provide the promotion and marketing service on behalf of the merchants to consumer devices. However, other types of locations may be identified as candidate locations and associated with a geofence. For example, concert venue locations, parks, public transportation terminals/stops, public services (e.g., police stations, fire station), etc.

At 310, the one or more servers 104 may be configured to determine a geofence set including a geofence associated with each of the proximate locations. Each geofence of the geofence set may be associated with a candidate location, and the geofence set may include geofences associated with the proximate locations programmatically selected from the candidate locations as being "near" the consumer device location.

Each geofence may include geofence data such as a location (e.g., latitude and longitude), a geofence radius (e.g., 200 meters), a geofence identifier, and a validuntil parameter defining the lifetime of the geofence (e.g, how long the consumer device should keep the geofence stored in memory or otherwise use the geofence, as discussed in further detail below). The geofence data may be represented by a datastructure including multiple fields, such as a latitude field, a longitude field, a geofence radius field, a validuntil field, and a goefence identifier field.

Each geofence may be further associated with notification data defining a notification. The notification may be an advertising message for a merchant shop location. The notification may be associated with a promotion, or may be a non-promotional item (e.g., an undiscounted product, service, or experience provided by the merchant shop location). In some embodiments, the notification data may be represented by a data structure including a text field defining message text (e.g., "Why not grab lunch around here? Restaurant X has a deal right near you."), an imageUri field defining an image location of an image associated with the notification, a link field defining a redirect address for access to an online purchase funnel or other aspect of the promotion and marketing service (e.g., to purchase a promotion or item), a badge number field defining a badge number for the consumer application icon (e.g., presented on the consumer device operating system home screen, or the like, when the consumer application is executing in the background), and a notification identifier that uniquely identifies the notification. When the notification is associated with a promotion, the notification data may further include promotion data fields. For example, the notification data structure may further include a promotional value field defining a promotional value (e.g., $40.00) of the promotion and/or an accepted value field defining an accepted value of the promotions (e.g., $25.00). In another example, when the notification data is associated with an item, the notification data may include an item price field defining a purchase price of the item.

At 312, the one or more servers 104 may be configured to determine whether the consumer device location is within a first geofence. The first geofence may be a geofence from a geofence set that was previously sent to the consumer device, such as via a proximity message response. In various embodiments, the one or more servers 104 and/or the consumer device 108 may be configured to determine geofence areas, such as by defining each geofence as being centered at the latitude and longitude values and extending the geofence radius in each direction around the latitude and longitude location to determine the geofence area of each geofence. Other stuitable definitions of geofence size, shape, and/or locations may be used to determine geofence areas. The geofence areas may then be compared with the consumer device location to determine whether the consumer device is located within any geofence of a geofence set. The "first" geofence, "second" geofence, etc., as used herein, refers to particular different geofences of a geofence set.

In some embodiments, the proximity message request may be sent from the consumer device when the consumer device determines that it is located within the first geofence. The proximity message request may include a geofence identifier, or the like, which may be used to determine that the consumer device is located within the first geofence.

In response to determining that the consumer device location is within a first geofence, method 300 may proceed to 314, where the one or more servers 104 may be configured to determine a maximum response time. The maximum response time defines a maximum time in which the one or more servers 104 are allowed to attempt to collect and/or present notification data associated with the first geofence (e.g., where the consumer device is located) on behalf of the consumer device. Put another way, the one or more servers 104 may not return any notification data to the consumer device if the notification data is unavailable within the maximum response time.

In some embodiments, the maximum response time may be determined based on being received as a parameter from the consumer device. For example, the proximity message request generated by the consumer device 108 and received by the one or more servers 104 at 306 "responseVersion" value. For example, a responseVersion value of two seconds may result in the one or more servers 104 determining a 2 second maximum response time. In some embodiments, the proximity message request may further include a 'locale' value indicating a preferred locale of the consumer (e.g. 'en_US', 'fr', etc). If not supplied, a default locale value may be used (e.g., en_US, Java's English locale, etc.). The one or more servers 104 may be configured to perform locale-sensitive operations to notifications based on the preferred locale, such as via transformations of the notification data (e.g., currency manipulations, unit conversions, character scripts, language translations, region specific-images/messages, etc.) to suit the conventions as specified by locale data defining such parameters of the preferred locale.

At 316, the one or more servers 104 may be configured to determine whether the notification data associated with the first geofence is collectable within the maximum response time. As discussed above, the maximum response time may define a maximum time in which the one or more servers 104 are allowed to attempt to collect and/or present notification data associated with the first geofence. For example, based on the location data defining the consumer device location, the one or more servers 104 may be configured to determine the geofence where the consumer device 108 is located by querying the one or more databases 106. In another example, the proximity message request may include a geofence identifier which may be used to perform the identification of the first goefence. A query to database 106 may additionally or alternatively include a request for notification data associated with the first geofence. Here, a clock may be initiated when the request for the notification data is made, and the one or more servers 104 may increment stop the clock when the maximum response time has been reached without receiving a response, or when a response is received prior to lapse of the maximum response time. However, various other techniques may be used to determine whether the notification data associated with the first geofence is collectable within the maximum response time.

In some embodiments, the maximum response time may be compared with a presentation time representing the notification data collection time and an additional data transfer time of the notification data (e.g., with a proximity message response) from the one or more servers 104 to the consumer device 108 (e.g., via network 112). In some embodiments, the data collection time may be an estimated time or taken from one or more previous communications (e.g., pinging). Here, the one or more servers 104 may be configured to compare the maximum response time with the presentation time to determine whether the notification data is "collectable" within the maximum response time. In some embodiments, no maximum response time is used.

In some embodiments, a single merchant shop location and/or geofence may be associated with a plurality of candidate promotions and/or items. The candidate promotions, for example, may be defined by promotion data stored in a promotion database of the promotion and marketing system 102 (e.g., the one or more databases 106). Each candidate promotion and/or item may be associated with a (e.g., different) notification and notification data. The candidate promotions and/or items may be scored and/or ranked by a universal relevance service provided by the promotion and marketing system 102 (e.g., the one or more servers 104). For example, the universal relevance service may receive the consumer device location, and may be configured to filter the candidate promotions based on the consumer device location (e.g., searching only promotions associated with the merchant). The universal relevance service may be further configured to score the filtered candidate promotions for relevance to the consumer. Here, the consumer device may be associated with a consumer account that is managed by the system 102. The system 102 may receive electronic marketing information from various networked devices (e.g., clickstream data and discretionary data from consumer devices, transaction data from merchant devices that interact with consumer devices, etc.) in the course of providing the promotion and marketing service, and may use the electronic marketing information to build a profile. Based on the profile and promotion parameters, the candidate promotions may then be scored and/or ranked. In some embodiments, the notification data associated with the highest ranking candidate promotion and/or item may be selected for inclusion within the notification response message. Additional details regarding a universal relevance service, applicable in some embodiments, are discussed in U.S. Provisional Patent Application No. 62/140,957, which is incorporated by reference above.

In response to determining that the notification data associated with the first geofence is collectable within the maximum response time, method 300 may proceed to 318, where the one or more servers 104 may be configured to generate a proximity message response including the geofence set and the notification data associated with the first geofence. The proximity message response may include the geofence set and/or the notification data associated with the first geofence where the consumer devices is located. An example of a proximity message response is shown below:

```
{
  geofences:
  [
    {
      lat: , // Lat of center of geo fence.
      lng: , // Lng of center of geo fence.
      radius: , // Radius of geo fence measured from the center in
      validUntil: ,// Time this geo fence should cease to be active.
      id: //A UUID formatted unique identifier for this geofence.
    },
    {
      lat: ,
      lng: ,
      .
      id:
    }
  ],
  muteUntil: , // If present stop all calls to this location update endpoint
  from the UTC time given. If absent assume that calls to the endpoint
  should continue until further notice.
  {
    text: ,// message text
    imageUri: ,// image link
    link: ,// deep link
    price: ,// deal price
    value: , // deal value
    badge: , // notification badge number (e.g., for iOS, Android, etc.)
    nid: // For NST GRP 18 log item (aka nid)
  }
}
```

The proximity message response includes the geofence data structure discussed above for each geofence. In some embodiments, the geofences order within the proximity message response may be sorted based on a priority, such as distance to the consumer device location. In some embodiments, the geofence set may include the first geofence where the consumer is located, which may be the highest priority. In another example, the geofence set may exclude the first geofence where the consumer device is located to avoid excessive or repeated proximity detections. The proximity message response further includes the notification data structure discussed above for the notification associated with the consumer device location.

An example of a proximity message response including examples of geofence data and notification data within the fields is shown below:

```
{
  "geofences" : [ {
    "id" : "296aa3c7-0d5d-4dc7-b587-2ee8d603fd66",
    "lat" : 37.789239,
    "lng" : −122.422374,
    "radius" : 200,
    "validUntil" : "2015-03-17T01:25:23Z"
  }, {
    "id" : "d5774cb2-a7b0-4797-adf7-97d7cbab7c4b",
    "lat" : 37.789239,
    "lng" : −122.422374,
    "radius" : 800,
    "validUntil" : "2015-03-17T01:25:23Z"
  } ],
  notification: {
    text: " Why not grab lunch around here? Restaurant X has a deal
    right near you ",
    imageUri: "https://img.servercdn.com/deal/
    7GByVdwiTyNKnbiBytRfpW/caffe_riace-2048x1242/v1/",
    link: "server:///dispatch/us/deal/restuarant-x-5?UTM_campaign=pl",
    price: "$25.00",
    value: "$40.00",
    badge: 42,
    nid: "sdg234"
  }
}
```

At 320, the one or more servers 104 may be configured to provide the proximity message response to the consumer device 108 via the network 112. As discussed in greater detail below, the notification data may be used by the consumer device to generate a "local notification" on the consumer device. A local notification, as used herein, refers to a notification that is generated on the consumer device (e.g., based on the proximity message response), and not a "push notification" that is sent through a (e.g., remote) push notification system 114 which generates the notification based on the notification data on behalf of the consumer device 108.

As discussed above, the consumer device 108 may be configured to store in a memory, or the like, the geofence set. Upon receiving a subsequent geofence set, the previously stored geofence set may be replaced. While a geofence set is stored in the consumer device 108, the consumer device may continue to monitor its location to determine whether it has reached a geofence of the geofence set. Upon reaching a geofence, the consumer device 108 may generate a proximity message request and send the proximity message request to the one or more servers 104 as discussed above at 306, and thus method 300 may be repeated as such.

Returning to 316, in response to determining that the notification data fails to be collectable within the maximum response time, method 300 may proceed to 322, where the one or more servers 104 may be configured to generate a proximity message response including the geofence set and independent of the notification data associated with the first geofence (e.g., as well as notification data associated with other geofences where the consumer device is not located).

At 324, the one or more servers 104 may be configured to provide the proximity message response to the consumer device 108 via the network 112. Some or all of the discussion at 320 may be applicable at 324. Here, however, the consumer device does not receive notification data, and thus does not generate a local notification. Advantageously, by sending the proximity message response without the notification data in the event that the maximum response time is exceeded, the system 102 is able to avoid delays, increase processing and networking resource throughput of remote and concurrent consumer device interactions, and increase reliability of proximity message responses to proximity message requests. In addition, the system 102 is able to better track consumer device interactions with the notifications, such as to generate electronic marketing information associated for targeted messaging (e.g., using a universal relevance service).

At 326, the one or more servers 104 may be configured to provide the notification data associated with the first geofence to a push notification server 116. For example, the one or more servers 104 may have been unable to collect and/or present the notification data within the maximum response time, but have successfully retrieved the notion data thereafter. Such notification data may then be sent to the push notification server 116 rather than be provided with the proximity message response. The push notification server 116 of the push notification system 114 may then be configured to generate a push notification based on the notification data on behalf of the consumer device 108, and provide the push notification to the consumer device 108 via the network 112. Unlike the proximity message response, which is "instant" or in real-time" with respect to the proximity message request, the push notification server 116 may be configured to queue up multiple push notifications for an asynchronous push. Alternatively, the notification data may be provided to the consumer device in a subsequent message separate from the proximity message response for location notification creation.

Returning to 312, in response to determining that the consumer device location fails to be located within any geofence of the geofence set, method 300 may proceed to 328, where the one or more servers 104 may be configured to generate a proximity message response including the geofence set and independent of notification data. Here, the consumer device 108 may have sent the proximity message request for a new and/or updated geofence set without the request being triggered by the consumer device being located within a geofence (e.g., of a previously stored geofence set stored within consumer device memory). At 330, the one or more servers may be configured to provide the proximity message response to the consumer device 108 via the network 112. The discussion at 322 and 324 may be applicable at 328 and 330 respectively.

In some embodiments, the one or more servers 104 may be configured to incorporate rate limit logic (e.g., specifying a maximum of 2 notifications per day to a particular consumer and/or consumer device). For example, the one or more servers 104 may be configured to track a proximity message response count. The proximity message response count may be initiated and zero and incremented for each instance of notification data sent to the consumer device 108 (e.g., directly or via a push notification server 116). The one or more servers 104 may be further configured to determine a proximity message response threshold, such as 2 notifications per day. In response to determining that the proximity message response count fails to exceed the proximity message response threshold, the one or more servers 104 provide a proximity message response to the consumer device 108 via the network 112. Furthermore, the proximity message response count may then be incremented. In response to determining that the proximity message response exceeds or matches the proximity message response threshold, the notification data may not be sent. Upon expiration of the relevant period (e.g., a day, a week, etc.), the proximity message response count may be reset to zero. In some embodiments, geofence set may also not be sent to the consumer device 108 if the proximity message response threshold has been exceeded for the relevant period Method 300 may end at 332.

FIG. 4 shows a flowchart of an example of a method 400 of processing a received proximity based message in accordance with some embodiments. Method 400 may being at 402, where the one or more servers 104 of the promotion and marketing system 102 may be configured to send a proximity message response including a geofence set and notification data associated with a first geofence where the consumer device 108 is located to the consumer device 108 via network 112. Some or all of the discussion at 318 and 320 of method 300 may be applicable at 402.

At 404, the consumer device 108 may be configured to generate a local notification based on the notification data. At 406, the consumer device 108 may be configured to provide the local notification to a consumer interface of the consumer device 108. The consumer interface may provide a display of the local notification including some or all of the notification data received with the proximity message response. The consumer interface may further include buttons or other interactive elements that allow the consumer to interact with the local notification via consumer device inputs, such as to view additional information about a promotion/item, purchase the promotion/item, and/or otherwise interact with the promotion and marketing service.

Additional details regarding generating a local notification are discussed below in connection with method 500 and FIG. 5.

At 408, the consumer device 108 may be configured to replace a stored geofence set (if applicable) with the geofence set received at 402, or the "received geofence set," within the memory of the consumer device. Where no previous geofence set is stored, the received geofence set may be stored and used for comparisons with consumer device locations. In another example, the most recent geofence set received from the one or more servers 104 may be stored in place of previous one or more geofence sets and used for the comparison. As such, the geofence sets may be kept fresh and up to date based on changing consumer device location, and without requiring excessive network 112 data transfers or burdensome consumer device memory storage requirements. For example, when the consumer application receives the geofence set, it may register the geofence set with mobile operating system. When the mobile operating system detects that one of the geofences has been reached, the mobile operating system may alert the consumer application.

At 410, the consumer device 108 may be configured to determine second location data. As discussed above, location data may be determined using various suitable techniques including global positioning system (GPS), wireless-assisted GPS, indoor navigation systems, cellular tower triangulation techniques, video surveillance systems, presence-based wireless detectors, personal area networks (PAN) such as Bluetooth or WiFi, infrared or other visual sensors, RFID location systems, etc. The consumer device may be configured to track location data over time, such as at periodic intervals, in response to consumer device inputs to refresh location data, etc.

At 412, the consumer device 108 may be configured to determine whether the consumer device 108 is within a second geofence of the received geofence set. The consumer device 108 may compare the location data determined over time via tracking with the geofence areas defined by the geofence set. Here, if the consumer has traveled from the first geofence to the second goefence while carrying the consumer device 108, the consumer device 108 may be determined as being within the second geofence.

In response to determining the consumer device 108 fails to be within any geofence of the received geofence set, method 400 may return to 410, where the consumer device 408 may be configured to continue to determine location data of the consumer device. Here, the consumer device 108 may have not yet reached any second geofence and thus the tracking of the location data and comparisons with the geofence set may be repeated.

In response to determining that the consumer device 108 is within the second geofence of the geofence set, method 400 may proceed to 414, where the consumer device 108 may be configured to provide a proximity message request including the second location data to the one or more servers 104 via the network 112. The discussion above at 306 of method 300 may be applicable at 414.

At 416, the one or more servers 104 may be configured to perform steps 308-328 of method 300 with the second location data in place of the previous location data. Advantageously, consumer device 108 is not required to send its location data to the one or more servers 104 via the network 112 unless a goefence has been reached. The location data tracking and comparisons to the geofence set may be performed locally on the consumer device. Thus excessive and inefficient mobile data use, battery use, server capacity, privacy concerns (e.g., system 102 only knows the geofences reached, rather than tracking fine consumer device location at all times), etc. are avoided. Method 400 may then end.

FIG. 5 shows a flowchart of an example of a method 500 of generating a local notification in accordance with some embodiments. A local notification refers to a notification that is generated by the consumer device 108 based on notification data (e.g., received in a proximity message response). The form and functionality of the local notification may be customized to consumer preferences and/or usage. For example, different notifications may be generated based on whether a consumer application is executing in the background or foreground of the mobile operating system.

Method 500 may begin at 502 and proceed to 504, where the one or more servers 104 may be configured to receive a proximity message response including a geofence set and notification data associated with a first geofence. The discussion at 318 and 320 of method 300 may be applicable at 504. In some embodiments, the proximity message response may not include the notification data independent of a geofence set. The geofence set, when received, may be used for subsequent proximity message request creation as discussed above.

At 506, the consumer device 108 may be configured to determine whether the consumer application is executing in the background or foreground of the mobile operating system. In general, the mobile operating system of the consumer device 108 may be configured to provide a multitasking environment for multiple applications. The foreground may include the application(s) the consumer is actively engaging, and the background may include the applications that are behind the scenes, or given a lesser priority for user interface real estate (e.g., display windows). The consumer application may be configured to operate both in background and foreground modes, and local notification may be tailored based on the operating mode when a proximity message response is received.

At 508, the consumer device 108 may be configured to generate a local notification based on the notification data, the local notification including an alert view. At 510, the consumer device 108 may be configured to provide the local notification to the consumer interface of the consumer device. FIG. 7 shows an example of a local notification 700 in accordance with some embodiments. Local notification 700 may be provided to the consumer interface when the consumer application is executing in the foreground of the mobile operating system, such as in the form of a popup window over the consumer application 714. The local notification 700 may be generated (e.g., with local notification circuitry 214 of the consumer device 108) based on the notification data received from the one or more servers 104. As such, local notification 700 may include image 702 as defined by the imageUri field of the notification data, message text 704 as defined by the text field of the notification data, a promotional value 706 as defined by the promotional value field of the notification, and an accepted value 708 as defined by the accepted value field of the notification data. The local notification 700 may further a close button 716 for closing the local notification and a buy button 710, which may provide a link to an online purchase funnel interface for the promotion identified in the local notification 700, as defined by the link field of the notification data.

Returning to 506, in response to determining that the consumer application is executing in the background, method 500 may proceed to 512, where the one or more servers 104 may be configured to generate a local notification based on the notification data, the local notification including consumer defined style. For example, the consumer defined style may include the alert view of local notification 700. Here, the mobile operating system may be configured to bring the consumer application to the foreground and provide the alert view of the location notification 700 to the consumer interface as shown in FIG. 7.

In another example, the consumer defined style may include a banner style. When the consumer application is executing in the background, the banner style of local notification may be provided to the consumer interface over the mobile operating system home screen or a second application. FIG. 8 shows an example of a local notification 800 in accordance with some embodiments. Local notification 800 may be provided to the consumer interface when the consumer application is executing in the background of the mobile operating system. As shown, the local notification 800 may be provided as a banner "pop up" overlay on home screen 806 of the consumer interface. Home screen 806 may include a plurality of application icons 804 configured to provide links that initiate the applications and/or bring the applications to the foreground. The local notification 800 may be generated (e.g., with local notification circuitry 214 of the consumer device 108) based on the notification data received from the one or more servers 104. The local notification 800 may include some or all of the notification data, such as message text 802 as defined by the text field of the notification data. The local notification 800 may operate as a buy button or the like, which may provide a link to the online purchase funnel interface for the promotion identified in the local notification 800 (e.g., as defined by the imageUri field of the notification data).

At 514, the consumer device 108 may be configured to determine whether the proximity message response includes a badge number. The badge number represents a new or unread notification count which may be provided as a graphical overlay or other modification to a consumer application icon presented on the consumer device operating system home screen. As discussed in greater detail below with respect to method 600 and FIG. 6, the one or more servers 104 may be configured to track consumer device presentation of and/or access to local notifications. The tracking of access may be used to generate the badge number and provide the badge number to the consumer device 108 with the proximity message response.

In response to determining that the proximity message response includes a badge number, method 500 may proceed to 516, where the consumer device 108 may be configured to update a consumer application icon of the mobile operating system. With reference to FIG. 8, one of the one or more applications icons 804 of the home screen 806 may include a consumer application icon 804a. When a badge number is received with the proximity message response, a badge icon 806 may be presented as a graphical overlay or other modification to the consumer application icon 804a. The badge icon 806 may include the badge number as defined by the badge number field in the notification data of the proximity message response. Method 500 may then proceed to 510, where the consumer device 108 may be configured to provide the local notification to the consumer interface of the consumer device 108.

Returning to 514, in response to determining that the proximity message response fails to include a badge number, method 500 may proceed to 510, where the consumer device 108 may be configured to provide the local notification to the consumer interface of the consumer device 108. Method 500 may then proceed to 518 and end.

FIG. 6 shows a flow chart of an example of a method 600 of tracking notifications in accordance with some embodiments. The one or more servers 104 may be configured to track local and/or push notifications provided to the consumer device. For example, the one or more servers 104 may be configured to track consumer device presentation of and/or access to notifications. The tracking may be performed to generate electronic marketing information about the consumer, which may be used to build consumer profiles, target promotions and/or items, generate subsequent notifications or other electronic marketing communications, etc.

Method 600 may begin at 602, where the consumer device 108 may be configured to provide a local notification to a consumer interface of the consumer device. The discussion at 510 of method 500 may be applicable at 602.

At 604, the consumer device 108 may be configured to determine a presentation indication indicating a display of the notification on the consumer device. The notification, whether a push notification or a local notification, may be displayed as shown in the alert view of FIG. 7 and/or as shown in the banner view of FIG. 8. Subsequent to the consumer device 108 generating a local notification and presenting the local notification to the consumer interface, the consumer device 108 may be configured to generate the presentation indication. Similarly, a presentation indication for a push notification may be generated subsequent to the consumer device 108 receiving the push notification from a push notification system 114.

In some embodiments, the proximity message response or other message sent from the one or more servers 104 may be configured to facilitate consumer device creation of the presentation indication by the consumer device. For example, the proximity message response may include "extra" field, such as the JSON formatted string "{"proximitylocalmessageshown": true}." Where present, the consumer device 108 may be configured to track presentation of the notification and generate the presentation indicator. The local notification may be advantageous to a push notification for tracking purposes because additional information used for the tracking may be communicated between the consumer device 108 and the one or more servers 104 based on the customizable nature of the proximity message request/response techniques. For example, many push notification systems 114 may specify the types of notification data and metadata that is required or can be provided, and such specifications can limit the tracking options to predefined activities supported by the push notification systems 114 when using a push notification.

At 606, the consumer device 108 may be configured to send the presentation indication to the one or more servers 104 of the system 102 via the network 112. The presentation indication may be sent, for example, with a subsequent proximity message request. Alternatively, the presentation indication may be sent separate from a proximity message request.

At 608, the consumer device 108 may be configured to determine an access indication indicating an interaction with the notification via consumer device input. With reference to the alert view local notification 700, the consumer device 108 may be configured to determine the access indication based on the consumer selecting one or more buttons of the local notification 700. Example buttons capable of signifying consumer access or interaction may include the buy button 710, the close button 716, and/or image 702. With reference to the banner view local notification 800, the consumer device 108 may be configured to determine the access indication based on the consumer selecting the banner, or some portion of the button (e.g., one or more buttons, when included).

In some embodiments, the proximity message response or other message sent from the one or more servers 104 may be configured to facilitate consumer device creation of the access indication by the consumer device. For example, the proximity message response may include extra field, such as the JSON formatted string "{"PushNotificationRecord": true }." Where present, the consumer device 108 may be configured to track consumer interaction with the local notification and generate the presentation indicator. In response the consumer device 108 may create the access indication accordingly.

At 610, the consumer device 108 may be configured to send the access indication to the one or more servers 104 of the system 102 via the network 112. The access indication may be sent, for example, with a subsequent proximity message request. Alternatively, the access indication may be sent separate from a proximity message request. The access indication may be sent with a presentation indication, or otherwise, such as in a subsequent proximity message request or a separate message.

At 612, the one or more servers 104 may be configured to store the presentation/access indication in one or more database 106 as electronic marketing information. The presentation and/or access indication may be used to generate electronic marketing information that allows the system 102 to track which communications have been received and their performance with consumers.

At 614, the one or more servers 104 may be configured to determine notification data based on the electronic marketing information. The discussion at 316 of method 300 may be applicable at 614. In addition to using the electronic marketing information for selecting targeted promotions and/or items for notifications, the system 102 may also leverage the electronic marketing information for other purposes. Some example may include generating consumer profiles and providing targeted electronic marketing communications (e.g., using notifications or other types of communication channels such as email, short messaging service (SMS) text, online social networking feeds/messages, etc. Method 600 my then end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory, that at least on memory storing instructions that, with the at least one memory, cause the apparatus to:
receive a proximity message request from a consumer device via a network, the proximity message request comprising location data defining a consumer device location of the consumer device;
determine a maximum response time defining a maximum time in which attempts to collect notification data associated with a location of interest of a first geofence associated with the consumer device location from at least one repository be completed on behalf of the consumer device, wherein the first geofence is associated with a geofence set comprising a plurality of geofences each associated with a respective location of interest proximate to the consumer device location; and
in response to determining that the notification data cannot be collected within the maximum response time:
transmit a proximity message response to the consumer device, the proximity message response comprising the geofence set independent of the notification data associated with the first geofence; and
in response to collecting the notification data after the maximum response time has elapsed:
transmit the notification data associated with the first geofence to a push notification server configured to generate a notification based on the notification data and asynchronously push the notification to the consumer device.

2. The apparatus of claim 1, wherein the at least one memory stores instructions that, with the at least one processor further cause the apparatus to:
in response to determining that the notification data can be collected within the maximum response time, transmit a proximity message response to the consumer device, the proximity message response comprising the geofence set and the notification data associated with the first geofence.

3. The apparatus of claim 1, wherein the first geofence is determined by:
determining proximate locations to the consumer device location based on the location data;
determining the geofence set including a geofence associated with each of the proximate locations; and
selecting the first geofence from the geofence set based at least in part on a proximate location associated with the consumer device location.

4. The apparatus of claim 1, wherein the notification is configured for display via a consumer interface of the consumer device in a first consumer defined style when a consumer application associated with the notification is executing in a background of a mobile operating system of the consumer device.

5. The apparatus of claim 4, wherein the first consumer defined style is one or more of a banner style, a banner overlay, or an alert view.

6. The apparatus of claim 5, wherein the alert view is configured to cause the mobile operating system to bring the consumer application to a foreground of the mobile operating system of the consumer device to display the notification.

7. The apparatus of claim 1, wherein the notification is configured for display via a consumer interface of the consumer device in a second consumer defined style when a consumer application associated with the notification is executing in a foreground of a mobile operating system of the consumer device.

8. The apparatus of claim 1, wherein the notification is configured for display via a consumer interface of the consumer device in a second consumer defined style when a consumer application associated with the notification is executing in a foreground of a mobile system of the consumer device.

9. The apparatus of claim 8, wherein the second consumer defined style is one or more of a popup window over the consumer application or a banner style.

10. The apparatus of claim 1, wherein the at least one memory stores instructions that, with the at least one processor, further cause the apparatus to:
receive a second proximity message request from the consumer device via the network, the second proximity message request comprising second location data defining a second consumer device location of the consumer device;
determine a travel speed associated with the consumer device based at least in part on the first location data and the second location data; and
select the notification data for transmission based on a second geofence selected based at least in part on the travel speed.

11. A computer implemented method, comprising:
receiving a proximity message request from a consumer device via a network, the proximity message request comprising location data defining a consumer device location of the consumer device;
determining a maximum response time defining a maximum time in which attempts to collect notification data associated with a location of interest of a first geofence associated with the consumer device location from at least one repository may be completed on behalf of the consumer device, wherein the first geofence is associated with a geofence set comprising a plurality of geofences each associated with a respective location of interest proximate to the consumer device location; and
in response to determining that the notification data cannot be collected within the maximum response time:
transmitting a proximity message response to the consumer device, the proximity message response comprising the geofence set independent of the notification data associated with the first geofence; and
in response to collecting the notification data after the maximum response time has elapsed:
transmitting the notification data associated with the first geofence to a push notification server configured to generate a notification based on the notification data and asynchronously push the notification to the consumer device.

12. The method of claim 11, further comprising:
in response to determining that the notification data can be collected with the maximum response time, transmitting a proximity message response to the consumer device, the proximity message response comprising the geofence set and the notification data associated with the first geofence.

13. The method of claim 11, wherein the first geofence is determined by:
determining proximate locations to the consumer device location based on the location data;
determining the geofence set including a geofence associated with each of the proximate locations; and
selecting the first geofence from the geofence set based at least in part on a proximate location associated with the consumer device location.

14. The method of claim 11, wherein the notification is configured for display via a consumer interface of the consumer device in a first consumer defined style when a consumer application associated with the notification is executing in a background of a mobile operating system of the consumer device.

15. The method of claim 14, wherein the first consumer defined style is one or more of a banner style, a banner overlay, or an alert view.

16. The method of claim 15, wherein the alert view is configured to cause the mobile operating system to bring the consumer application to a foreground of the mobile operating system of the consumer device to display the notification.

17. The method of claim 11, wherein the notification is configured for display via a consumer interface of the consumer device in a second consumer defined style when a consumer application associated with the notification is executing in a foreground of a mobile operating system of the consumer device.

18. The method of claim 11, wherein the notification is configured for display via a consumer interface of the consumer device in a second consumer defined style when a consumer application associated with the notification is executing in a foreground of a mobile operating system of the consumer device.

19. The method of claim 18, wherein the second consumer defined style is one or more of a popup window over the consumer application or a banner style.

20. The method of claim 11, further comprising:
receiving a second proximity message request comprising a second location data defining a second consumer device location of the consumer device;
determining a travel speed associated with the consumer device based at least in part on the first location data and the second location data; and
selecting the notification data for transmission based on a second geofence selected based at least in part on the travel speed.

21. The method of claim 11, wherein the maximum response time is determined based at least in part on a response time parameter received from the consumer device.

* * * * *